United States Patent
Yoon et al.

(10) Patent No.: US 10,014,508 B2
(45) Date of Patent: *Jul. 3, 2018

(54) BATTERY MODULE ASSEMBLY

(75) Inventors: Junill Yoon, Daejeon (KR); Jong-yul Ro, Daejeon (KR); Heekook Yang, Daejeon (KR); Jongmoon Yoon, Daejeon (KR); Do Yang Jung, Daejeon (KR)

(73) Assignee: LG CHEM, LTD., Seoul (KR)

( * ) Notice: Subject to any disclaimer, the term of this patent is extended or adjusted under 35 U.S.C. 154(b) by 635 days.

This patent is subject to a terminal disclaimer.

(21) Appl. No.: 13/357,716

(22) Filed: Jan. 25, 2012

(65) Prior Publication Data

US 2012/0214039 A1 Aug. 23, 2012

Related U.S. Application Data

(63) Continuation-in-part of application No. 12/516,267, filed as application No. PCT/KR2007/005337 on Oct. 27, 2007, now Pat. No. 8,125,192.

(30) Foreign Application Priority Data

Nov. 27, 2006 (KR) .......................... 10-2006-0117317

(51) Int. Cl.
*H01M 10/04* (2006.01)
*H01M 2/20* (2006.01)
(Continued)

(52) U.S. Cl.
CPC ............. *H01M 2/206* (2013.01); *H01M 2/02* (2013.01); *H01M 2/024* (2013.01); *H01M 2/06* (2013.01);
(Continued)

(58) Field of Classification Search
CPC .. H01M 2/0245; H01M 2/0247; H01M 2/206; H01M 10/6562; H01M 10/613;
(Continued)

(56) References Cited

U.S. PATENT DOCUMENTS 6,275,003 B1  8/2001  Marukawa et al.
6,411,063 B1 * 6/2002  Kouzu ................. B60L 3/0046
                                                    320/150
(Continued)

FOREIGN PATENT DOCUMENTS

JP   2000-48867 A    2/2000
JP   2001-176472 A   6/2001
(Continued)

*Primary Examiner* — Nicholas P D'Aniello
*Assistant Examiner* — Philip A. Stuckey
(74) *Attorney, Agent, or Firm* — Birch, Stewart, Kolasch & Birch, LLP

(57) ABSTRACT

Disclosed herein is a battery module assembly configured to have a structure in which a plurality of rectangular battery modules, each of which has two or more battery cells or unit modules connected in series and/or in parallel to each other, are stacked by two or more in a width direction (a longitudinal direction) thereof and in a height direction (a transverse direction) thereof so that the rectangular battery modules generally constitute a hexahedral structure (a hexahedral stack), outer edges of the hexahedral stack are fixed by a frame member, and coupling parts for mounting, through which the battery module assembly is mounted to an external device, are provided at one side of the frame member.

18 Claims, 5 Drawing Sheets

(51) Int. Cl.
*H01M 2/02* (2006.01)
*H01M 2/06* (2006.01)
*H01M 2/30* (2006.01)
*H01M 10/625* (2014.01)
*H01M 10/613* (2014.01)
*H01M 10/6562* (2014.01)

(52) U.S. Cl.
CPC ......... *H01M 2/305* (2013.01); *H01M 10/613* (2015.04); *H01M 10/625* (2015.04); *H01M 10/6562* (2015.04); *H01M 2220/20* (2013.01)

(58) Field of Classification Search
CPC ........ H01M 10/625; H01M 2/02; H01M 2/06; H01M 2/024; H01M 2/305; H01M 2220/20
USPC .......................................................... 429/163
See application file for complete search history.

(56) References Cited

U.S. PATENT DOCUMENTS

| | | | |
|---|---|---|---|
| 6,472,098 B1 * | 10/2002 | Sawada | B60L 11/1809 429/100 |
| 6,475,659 B1 * | 11/2002 | Heimer | H01M 2/0262 429/130 |
| 6,482,541 B1 * | 11/2002 | Bator, Jr. | H01M 2/1077 429/100 |
| 6,541,154 B2 * | 4/2003 | Oogami et al. | 429/159 |
| 6,635,380 B1 * | 10/2003 | Shimoda et al. | 429/93 |
| 7,291,421 B2 | 11/2007 | Kimura et al. | |
| 7,858,229 B2 | 12/2010 | Shin et al. | |
| 7,898,263 B2 | 3/2011 | Ishida et al. | |
| 2004/0021442 A1 * | 2/2004 | Higashino | H01M 10/0413 320/112 |
| 2005/0202311 A1 | 9/2005 | Higashino et al. | |
| 2005/0287400 A1 | 12/2005 | Cho | |
| 2006/0127754 A1 | 6/2006 | Hamada et al. | |
| 2007/0141457 A1 | 6/2007 | Amagai | |

FOREIGN PATENT DOCUMENTS

| | | | | |
|---|---|---|---|---|
| JP | 2002-42763 A | | 2/2002 | |
| JP | 2002-190288 A | | 7/2002 | |
| JP | 2002-289161 | | 10/2002 | |
| JP | 2002289161 A | * | 10/2002 | ............. H01M 2/10 |
| JP | 2002-367666 A | | 12/2002 | |
| JP | 2002367666 A | * | 12/2002 | ............. H01M 8/24 |
| JP | 2003-257505 A | | 9/2003 | |
| JP | 2003-317812 A | | 11/2003 | |
| JP | 2004-273428 A | | 9/2004 | |
| JP | 2005-209367 | | 8/2005 | |
| JP | 2005-209369 A | | 8/2005 | |
| JP | 2005209367 A | * | 8/2005 | ............ H01M 10/50 |
| JP | 2006-306376 A | | 11/2006 | |
| WO | WO 2006/043163 A1 | | 4/2006 | |
| WO | WO 2006043163 A1 | * | 4/2006 | |
| WO | WO 2006/068366 A1 | | 6/2006 | |

* cited by examiner

BATTERY MODULE ASSEMBLY

This application is a Continuation-In-Part of co-pending application Ser. No. 12/516,267 filed Feb. 24, 2010, which is the National phase of PCT International Application No. PCT/KR2007/005337 filed on Oct. 27, 2007. This application also claims priority to Patent Application No. 10-2006-0117317 filed in the Republic of Korea on Nov. 27, 2006, all of which are hereby expressly incorporated by reference into the present application.

DETAILED DESCRIPTION OF THE INVENTION

Object of the Invention

Figure 1:
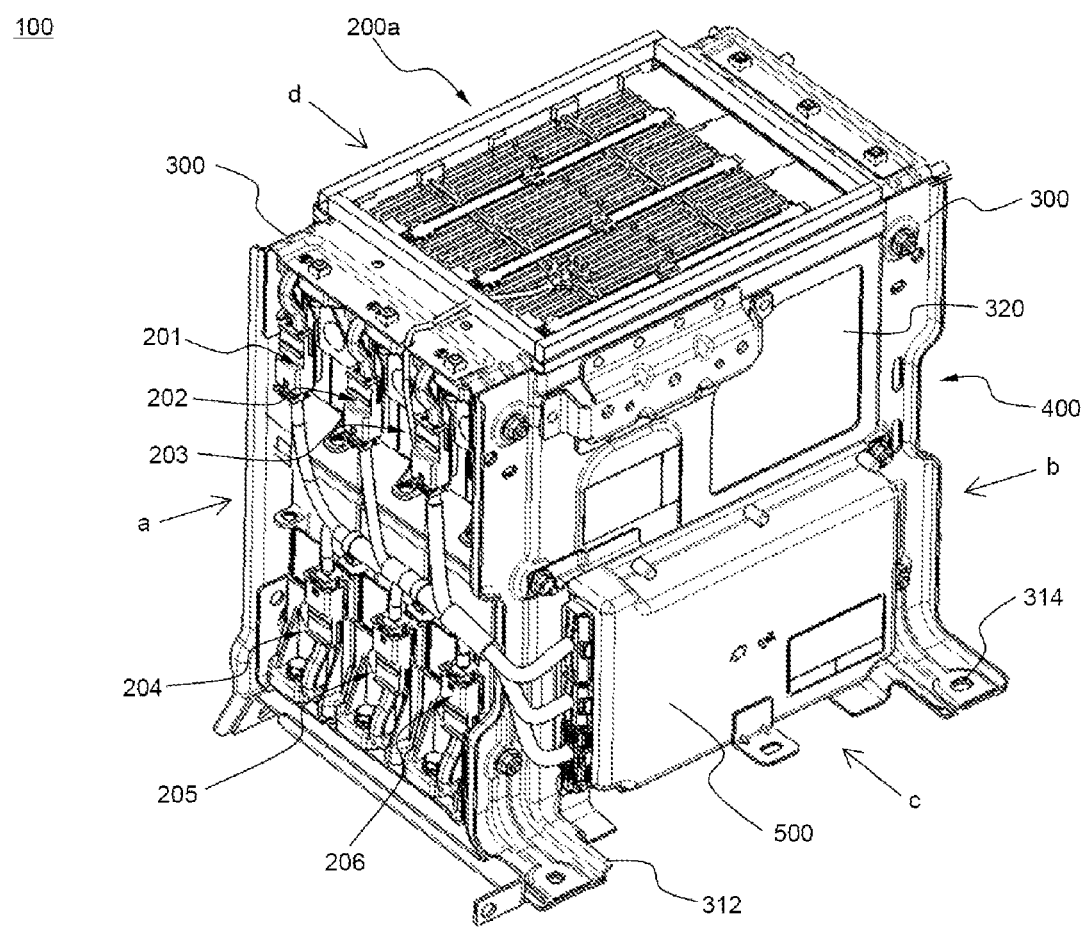
FIG. 1 is a typical view showing a battery module assembly according to an embodiment of the present invention configured to have a structure in which rectangular battery modules, which constitute a hexahedral stack, are fixed by a frame member.

Field of the Invention and Related Art

The present invention relates to a battery module assembly, and, more particularly, to a battery module assembly configured to have a structure in which a plurality of rectangular battery modules, each of which has two or more battery cells or unit modules connected in series and/or in parallel to each other, are stacked by two or more in a width direction (a longitudinal direction) thereof and in a height direction (a transverse direction) thereof so that the rectangular battery modules generally constitute a hexahedral structure (a hexahedral stack), outer edges of the hexahedral stack are fixed by a frame member, and coupling parts for mounting, through which the battery module assembly is mounted to an external device, are provided at one side of the frame member.

Recently, a secondary battery, which can be charged and discharged, has been widely used as an energy source for wireless mobile devices. Also, the secondary battery has attracted considerable attention as a power source for electric vehicles (EV) and hybrid electric vehicles (HEV), which have been developed to solve problems, such as air pollution, caused by existing gasoline and diesel vehicles using fossil fuel.

Small-sized mobile devices use one or several battery cells for each device. On the other hand, middle or large-sized devices, such as electric vehicles, use a middle or large-sized battery module having a plurality of battery cells electrically connected to each other because high power and large capacity are necessary for the middle or large-sized devices.

Preferably, the middle or large-sized battery module is manufactured so as to have as small a size and weight as possible. For this reason, a prismatic battery or a pouch-shaped battery, which can be stacked with high integration and has a small weight to capacity ratio, is usually used as a battery cell of the middle or large-sized battery module. In particular, much interest is currently generated in the pouch-shaped battery, which uses an aluminum laminate sheet as a sheathing member, because the pouch-shaped battery is lightweight, the manufacturing cost of the pouch-shaped battery is low, and it is easy to modify the shape of the pouch-shaped battery.

In order for the middle or large-sized battery module to provide power and capacity required by a predetermined apparatus or device, it is necessary for the middle or large-sized battery module to be configured to have a structure in which a plurality of battery cells is electrically connected in series to each other, and the battery cells are stable against an external force.

Consequently, when a middle or large-sized battery module is configured using a plurality of battery cells, a plurality of members for mechanical coupling and electrical connection between the battery cells is generally needed, and, as a result, a process for assembling the mechanical coupling and electrical connection members is very complicated. In addition, there is needed a space for coupling, welding or soldering the mechanical coupling and electrical connection members with the result that the total size of the system is increased. The increase in size of the system is not preferred in the aspect of the spatial limit of an apparatus or device in which the middle or large-sized battery module is installed. Furthermore, the middle or large-sized battery module must be configured to have a more compact structure so that the middle or large-sized battery module can be effectively installed in a limited inner space, such as a vehicle.

In connection with this case, Japanese Patent Application Publication No. 2005-050616 discloses a middle or large-sized battery module installed in a large-sized vehicle, such as a bus, wherein the battery module includes a lower rack in which two battery packs are disposed and an upper rack in which two battery packs are disposed, a stand member of the lower rack and a stand member of the upper rack are suspended from a body of the vehicle via a suspension member of the lower rack and a suspension member of the upper rack, the stand members exhibit high strength, and the suspension members exhibit low strength, thereby improving safety of the battery module against external force applied to the battery module due to a vehicle crash.

In the above-mentioned middle or large-sized battery module, a plurality of racks is used to improve safety of the vehicle when a vehicle crash occurs. However, two complicated racks are provided to mount a total of four battery packs with the result that the volume and weight of the battery module are increased. Consequently, it is technically difficult to configure the battery module so that the battery module has a compact structure. That is, the above-mentioned technology has problems in that the outer form of the battery module must be increased to provide high mechanical strength, and therefore, the volume and weight of the battery module are increased.

Meanwhile, a battery module assembly is a structural body constituted by combining a plurality of battery cells, and therefore, safety and operational efficiency of the battery module assembly is greatly lowered when some of the battery cells suffer from overvoltage, overcurrent and overheating. For this reason, means to detect and control overvoltage, overcurrent and overheating are needed. Consequently, voltage sensors and temperature sensors are connected to the battery cells to check and control an operation state of the battery cells in real time or at predetermined intervals. Installation or connection of such detection means and control means very complicate a process of assembling the battery module. Also, a plurality of wires is needed to connect the detection means and control means with the result that a short circuit may occur in the battery module.

Therefore, there is high necessity for a battery module assembly which is compact and exhibits high structural stability and to which detection means can be easily mounted as described above.

Technical Problems to be Solved by Means of the Invention

Therefore, the present invention has been made to solve the above problems, and other technical problems that have yet to be resolved.

Specifically, it is an object of the present invention to provide a battery module assembly having a compact structure in which the battery module assembly can be stably mounted in a limited space, such as a vehicle, while the battery module assembly has a minimum space occupation, the number of members for mechanical coupling and electrical connection is reduced, the battery module assembly can be assembled using a simple method, and the battery module assembly exhibits high structural stability against external impact.

Construction and Operation of the Invention

In accordance with one aspect of the present invention, the above and other objects can be accomplished by the provision of a battery module assembly configured to have a structure in which a plurality of rectangular battery modules, each of which has two or more battery cells or unit modules connected in series and/or in parallel to each other, are stacked by two or more in a width direction (a longitudinal direction) thereof and in a height direction (a transverse direction) thereof so that the rectangular battery modules generally constitute a hexahedral structure (a hexahedral stack), outer edges of the hexahedral stack are fixed by a frame member, and coupling parts for mounting, through which the battery module assembly is mounted to an external device, are provided at one side of the frame member.

That is, the battery module assembly according to the present invention is configured to have a structure in which a plurality of rectangular battery modules is stacked in a longitudinal direction and in a transverse direction to constitute a hexahedral stack, and the hexahedral stack is fixed by a frame member. Consequently, the battery module assembly according to the present invention has a compact and stable structure. In addition, mechanical coupling and electrical connection between the rectangular battery modules are achieved without using a large number of members.

Also, coupling parts for mounting, through which the battery module assembly is mounted to an external device, are provided at a part of the frame member to fix edges of one side of the hexahedral stack. Consequently, the battery module assembly can be easily and stably installed in an external device, such as a vehicle.

In a preferred example, the coupling parts for mounting may be configured to have a structure in which the coupling parts for mounting are bent so that the coupling parts for mounting protrude outward in a state in which ends of the coupling parts for mounting are coupled to the frame member.

That is, four coupling parts for mounting, which protrude outward, are mechanically coupled to an external device in a state in which a main body of the frame member is stably coupled to the battery module assembly. Consequently, one of the six sides of the battery module assembly can be securely coupled to the device.

In the present invention, each of the rectangular battery modules, constituting the hexahedral stack, is configured to have a structure in which two or more battery cells or unit modules is connected in series and/or in parallel to each other, as described above. For example, two or more plate-shaped battery cells may be stacked to constitute each of the rectangular battery modules. Preferably, the hexahedral stack is configured to have a structure in which two rectangular battery modules are arranged in the transverse direction so that the rectangular battery modules are opposite to each other, and one or more rectangular battery modules are arranged in the longitudinal direction with respect to the respective rectangular battery modules.

Each of the rectangular battery modules may have a large height to width ratio, and the hexahedral stack may have an approximately rectangular parallelepiped structure. Consequently, the battery module assembly is configured to have a compact and stable structure, and the battery module assembly can be installed in a predetermined region, such as an inner space, of a vehicle without limitation as to size.

Each of the unit modules may be configured to have various structures, a preferred example of which will be described hereinafter.

Each of the unit modules is configured to have a structure in which plate-shaped battery cells, each of which has electrode terminals formed at the upper end and the lower end thereof, are connected in series to each other, and each of the unit modules includes two or more battery cells, in which connection parts between the electrode terminals are folded so that the battery cells are stacked, and a high-strength cell cover coupled to outer sides of the battery cells excluding regions of the electrode terminals so as to cover the outer sides of the battery cells.

Each of the plate-shaped battery cells is a secondary battery cell having a small thickness and a relatively large width and length so that, when a plurality of battery cells is stacked to constitute a battery module, the total size of the battery module is minimized. In a preferred example, a battery cell may be a second battery cell configured to have a structure in which an electrode assembly is mounted in a battery case formed of a laminate sheet including a resin layer and a metal layer, and electrode terminals protrude from the upper end and lower end of the battery case. Specifically, the battery cell may be configured to have a structure in which the electrode assembly is mounted in a pouch-shaped case formed of an aluminum laminate sheet. The secondary battery cell with the above-stated construction may be referred to as a pouch-shaped battery cell.

Two or more battery cells are covered by a high-strength cell cover which is made of a synthetic resin or metal material to constitute a unit module. The cell cover protects the battery cells, which have low mechanical strength, and, in addition, restrains the change in repetitive expansion and contraction during charge and discharge of the battery cells, thereby preventing sealed portions of the battery cells from being separated from each other. Consequently, it is possible to manufacture a middle or large-sized battery module assembly exhibiting better safety.

The battery cells are connected in series and/or in parallel to each other in one unit module, or the battery cells of one unit module are connected in series and/or in parallel to the battery cells of another unit module. In a preferred example, a plurality of unit modules may be manufactured by coupling electrode terminals of the battery cells to each other in a state in which the battery cells are arranged in series in the longitudinal direction so that the electrode terminals of the battery cells are successively adjacent to each other, folding the battery cells by two or more so that the battery cells are stacked, and covering the stacked battery cells by predetermined numbers with the cell cover. According to circumstances, two or more battery cells may be covered by a cell cover to constitute a unit module, a plurality of unit modules may be stacked, and electrode terminals of the unit modules may be connected to each other to achieve electrical connection therebetween.

The details of a unit module and a rectangular battery module manufactured using a plurality of unit modules are disclosed in Korean Patent Application No. 2006-45443, which has been filed in the name of the applicant of the present application and the disclosure of which is incorporated herein by reference.

In the above description, "the opposite arrangement" means that the corresponding regions of the two rectangular battery modules face each other. For example, in a case in which each rectangular battery module is configured to have a structure in which the input and output terminals are located at one side of each rectangular battery module, the input and output terminals of the respective rectangular battery modules may be oriented so that the input and output terminals of the rectangular battery modules are directed toward one side (a) of the hexahedral stack. This opposite arrangement structure has an advantage of further simplifying the construction for electrical connection.

In this arrangement structure, a power relay assembly (PRA) to prevent overcurrent and overvoltage and to achieve voltage drop during separation of the battery module assembly may be mounted to a rear side (b), i.e. a side opposite to the side where the input and output terminals are located.

According to circumstances, the PRA to prevent overcurrent and overvoltage and to achieve voltage drop during separation of the battery module assembly may be mounted to a lateral side (c) adjacent to the side (a) of the hexahedral stack.

In this structure, an electrical connection structure is simplified, and an assembly process based on the simplified electrical connection structure is also simplified. Also, the length of electrical connection means is reduced to prevent increase of internal resistance and to lower a possibility of the connection means being short circuited due to external impact.

The battery cells or the unit modules in each of the rectangular battery modules are arranged in parallel to a pair of opposite sides (c, d) of the hexahedral stack in order to accomplish high space utilization. In this case, therefore, the rectangular battery modules are arranged in parallel to the opposite sides (c, d) of the hexahedral stack. A coolant flows through gaps defined between the respective rectangular battery modules to remove heat generated from the battery cells during charge and discharge of the battery cells.

In the battery module assembly according to the present invention, on the other hand, the frame member, which fixes the rectangular battery modules, fixes only the outer edges of the hexahedral stack. Preferably, therefore, hermetically sealing members are mounted to the opposite sides (c, d) to guide the coolant so that the coolant limitedly flows in a predetermined direction and, at the same time, to reduce temperature deviation between the outer and inner rectangular battery modules.

That is, the hermetically sealing members, which are mounted to the opposite sides (c, d) of the hexahedral stack, respectively, close the opposite sides of the hexahedral stack, whereby the coolant flows only through the hexahedral stack. Consequently, it is possible to prevent relatively rapid cooling of the outer rectangular battery modules which are exposed outward in a case in which the hermetically sealing members are not mounted. Generally, rapid cooling of the battery modules is preferable. However, a high cooling rate of some battery modules in a middle or large-sized battery system causes unbalance between the battery modules, and such unbalance between the battery modules eventually accelerates degradation of the battery cells. Consequently, the hermetically sealing members form a coolant (air) flow channel and, at the same time, serve to increase temperature uniformity between the battery modules.

Each of the hermetically sealing members may be bent so that the coolant flow channel is formed at the inner side of each of the hermetically sealing members facing a corresponding one of the rectangular battery modules. Also, each of the hermetically sealing members is preferably formed of an insulating material to further increase temperature uniformity between the battery modules, as described above. Especially, the hermetically sealing members may be made of a foamed resin to increase a heat insulation property of the battery module assembly while minimizing the total weight of the battery module assembly.

More specific positions of the sides (a, b, c, d) are shown in FIG. 1.

The frame member, which fixes the outer edges of the hexahedral stack, constituted by the rectangular battery modules, may be configured to have various structures. For example, the frame member may be configured to have a structure in which all frames to fix twelve edges of the hexahedral stack are integrally formed or in which frames to fix at least three or four edges of the hexahedral stack constituting one side of the hexahedral stack are integrally formed.

According to circumstances, the hermetically sealing members may be mounted to the frame member to close the opposite sides (c, d) of the hexahedral stack.

Also, the PRA may be configured to have a structure in which safety elements and control elements are disposed at a plate fastened to a part of the frame member to fix edges of one side of the hexahedral stack. In a preferred example, the PRA may be configured to have a structure in which various elements are mounted at the top of a plastic board in a state in which the elements are electrically connected to each other via bus bars. The plastic board is coupled to the frame member. Consequently, the plastic board also serves to maintain the form of the frame member.

In accordance with another aspect of the present invention, there is provided a high-power and large-capacity middle or large-sized battery pack constituted by connecting a plurality of battery module assemblies.

The battery pack according to the present invention may be manufactured by combining battery modules based on desired power and capacity. Also, the battery pack according to the present invention may be applied to various devices in consideration of installation efficiency and structural stability as previously described.

In particular, the battery pack according to the present invention can be preferably used as a power source for an electric vehicle, a hybrid electric vehicle, a plug-in hybrid electric vehicle, an electric motorcycle, an electric bicycle, or a power storage device, which has a limited installation space and/or are exposed to frequent vibration and strong impact; however, the present invention is not limited thereto.

In accordance with a further aspect of the present invention, there is provided a device including the battery pack with the above-stated construction as a power source. A structure and manufacturing method of such a device are well known in the art to which the present invention pertains, and therefore, a detailed description thereof will be omitted.

Now, preferred embodiments of the present invention will be described in detail with reference to the accompanying drawings. It should be noted, however, that the scope of the present invention is not limited by the illustrated embodiments.

FIG. 1 is a typical view showing a battery module assembly according to an embodiment of the present invention configured to have a structure in which rectangular battery modules, which constitute a hexahedral stack, are fixed by a frame member.

Referring to FIG. 1, a battery module assembly 100 includes six rectangular battery modules 201, 202, 203, 204, 205 and 206, a frame member 300 to fix outer edges of a hexahedral stack 200a, which is constituted by the six rectangular battery modules 201, 202, 203, 204, 205 and 206, a power relay assembly (PRA) 400, and a battery management system (BMS) 500. The battery module assembly 100 is generally configured in the shape of a rectangular parallelepiped.

The six rectangular battery modules 201, 202, 203, 204, 205 and 206 are arranged to have a structure in which the six rectangular battery modules 201, 202, 203, 204, 205 and 206 are stacked by threes in the transverse direction and by twos in the longitudinal direction. Also, the six rectangular battery modules 201, 202, 203, 204, 205, and 206 are stacked to have a facing arrangement structure in which input and output terminals (not shown) formed at corresponding sides of the six rectangular battery modules 201, 202, 203, 204, 205 and 206 are adjacent to each other. That is, the upper-row battery modules 201, 202 and 203 are disposed at the tops of the lower-row battery modules 204, 205 and 206 in a state in which the upper-row battery modules 201, 202, and 203 are upside down so that the upper-row battery modules 201, 202, and 203 are symmetrical with the lower-row battery modules 204, 205 and 206 about an imaginary central line.

Each of the rectangular battery modules 201, 202, 203, 204, 205 and 206 is configured to have a structure in which a plurality of plate-shaped unit modules is mounted in each of the rectangular battery modules 201, 202, 203, 204, 205 and 206 in a state in which the plate-shaped unit modules are erected, the details of which will be described below with reference to FIG. 2.

The frame member 300 is configured to have a structure in which a plurality of frames is coupled to each other so that twelve outer edges of the hexahedral stack 200a are stably fixed by the frames. In a state in which the hexahedral stack 200a is mounted in the frame member 300, six sides of the hexahedral stack 200a are exposed to the outside.

Each coupling part for mounting 312 has opposite ends bent so as to protrude outward. A fastening hole 314, through which the battery module assembly is coupled to an external device (not shown), are formed at each coupling part for mounting 312. Consequently, the battery module assembly can be fastened to the external device using bolts and nuts.

Of course, other different structures, through which the battery module assembly can be fastened to the external device, may be used instead of the fastening hole 314 of each coupling part for mounting 312.

Hermetically sealing members 320 are fitted in hollow parts defined between the frame member 300 and opposite sides of the hexahedral stack 200a. Each of the hermetically sealing members 320 is formed of a foam resin exhibiting high thermal insulation and low weight. A bent structure (not shown) defining a coolant flow channel is formed at the inner side of each of the hermetically sealing members 320.

Also, the PRA 400 is mounted at a side opposite to one side (a) where the input and output terminals are located, i.e. a rear side (b), to conduct current so as to perform charge and discharge, if necessary, to perform appropriate voltage drop upon start or disassembly of the battery system, to perform electrical connection with the rectangular battery modules, and to protect a circuit from overcurrent or overvoltage. In addition, the BMS 500, which controls the operation of the battery modules, is mounted to a lateral side (c).

The details of the PRA 400 will be described below with reference to FIG. 7.

Figure 2:
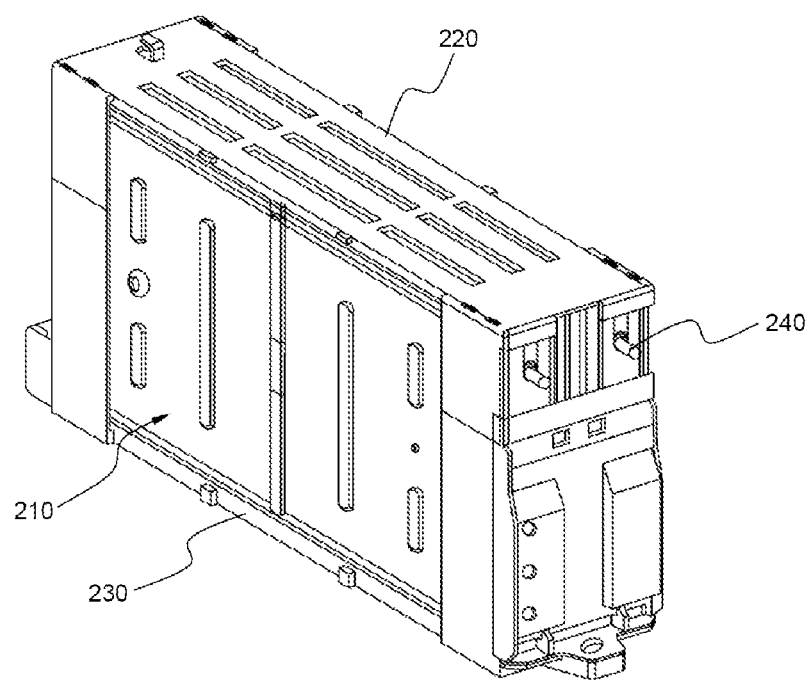
FIG. 2 is a typical view showing a structure of one of the rectangular battery modules constituting the hexahedral stack in the battery module assembly of FIG. 1.
Figure 3:
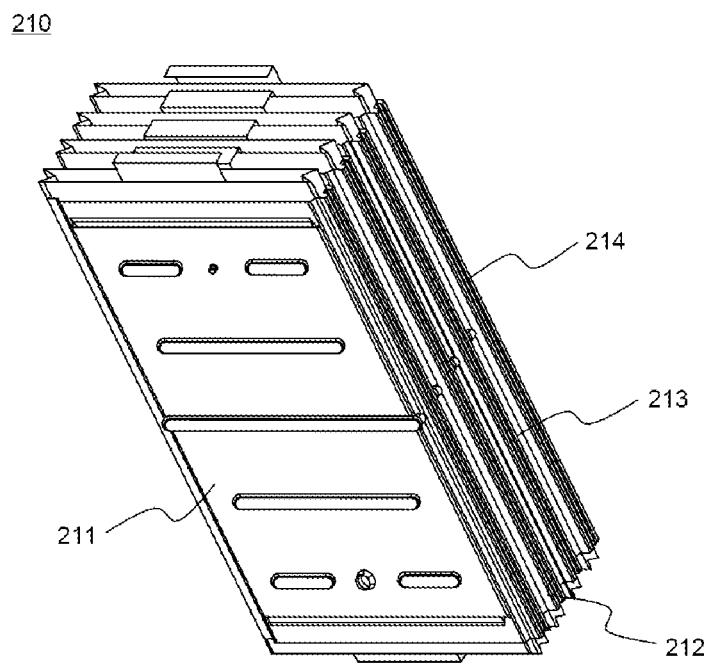
FIGS. 3 and 4 are typical views showing structures of unit modules and a pack case constituting one of the rectangular battery modules.
Figure 4:
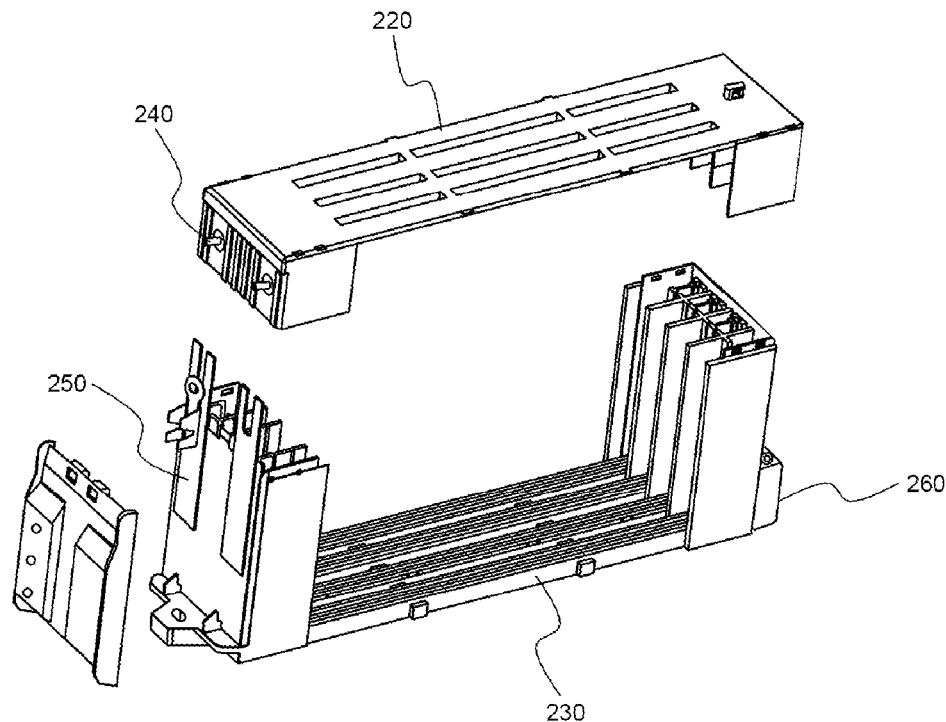
Figure 5:
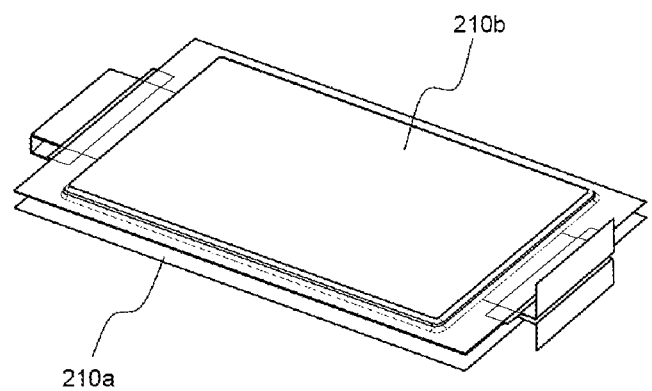
FIGS. 5 and 6 are typical views showing battery cells and a cell cover constituting one of the unit modules.
Figure 6:
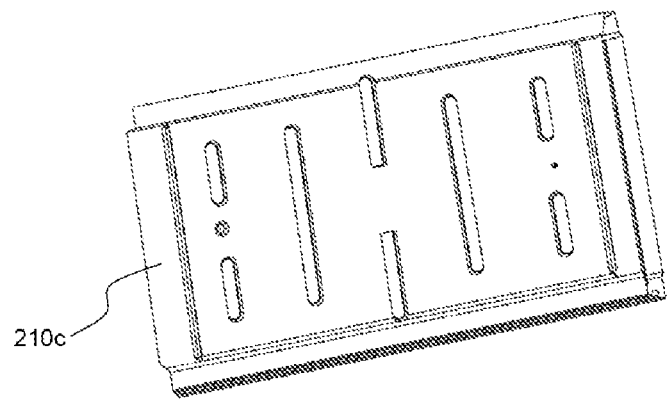

FIG. 2 is a perspective view showing a structure of one of the rectangular battery modules constituting the hexahedral stack in the battery module assembly of FIG. 1, and FIGS. 3 and 4 are perspective views showing unit modules and a pack case constituting one of the rectangular battery modules. Also, FIGS. 5 and 6 are perspective views typically showing battery cells and a cell cover constituting one of the unit modules.

Referring to these drawings, the rectangular battery module 201 is configured to have a structure in which a unit module stack 210 is mounted in upper and lower assembly type pack cases 220 and 230 in a state in which the unit module stack 210 is erected on the side thereof. The input and output terminals 240 are formed at the front of the upper case 220. At the front of the lower case 230 are formed bus bars 250 for electric connection with the input and output terminals 240. At the rear of the lower case 230 are formed connectors 260 for connection with voltage and temperature sensors.

The unit module stack 210 is configured to have a structure in which four unit modules 211, 212, 213 and 214 are stacked in a state in which the unit modules are electrically connected to each other. Each of the unit modules, for example the unit module 211, is configured to have a structure in which two battery cells 210a and 210b, each of which has a cathode terminal and an anode terminal formed at opposite ends thereof, are connected in series to each other and are covered by a high strength cell cover 210c in a state in which the electrode terminals are folded.

Figure 7:
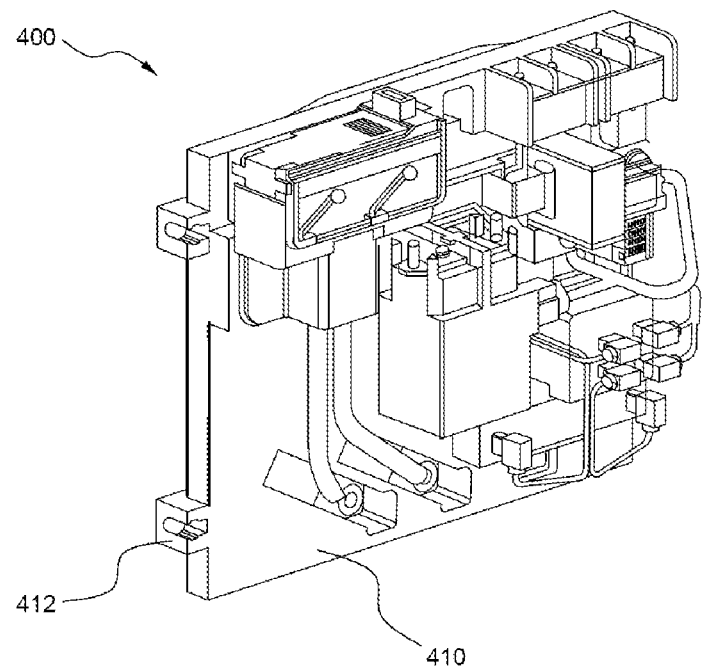
FIG. 7 is a typical view showing a power relay assembly (PRA) mounted to the battery module assembly.

FIG. 7 is a typical view showing a structure of the PRA.

Referring to FIG. 7, the PRA 400 is configured to have a structure in which various elements are mounted at the top of a thick plastic board 410 in a state in which the elements are connected to each other via bus bars and wires.

The insulative plastic board 410 is configured to have a structure in which the insulative plastic board 410 has a shape and size sufficient to be coincidently mounted at the rear side (b) of the battery module assembly surrounded by the frame member 300 as shown in FIG. 1, and fastening parts 412 for coupling protrude from opposite sides of the insulative plastic board 410. The fastening parts 412 are mechanically fastened to the frame member 300 of FIG. 1.

Consequently, the plastic board 410 of the PRA 400 not only provides a space in which the related elements, the bus bar and the wires can be received, but also serves as a structural body to support the frame member.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

Effects of the Invention

As is apparent from the above description, the battery module assembly according to the present invention has a compact structure which can be stably mounted in a limited space, such as a vehicle, while the battery module assembly has a minimum space occupation. Also, the mounting frames are easily mounted to an external device, and coupling force between the mounting frames and the external device is improved. Consequently, the battery module assembly has an effect of exhibiting high structural stability against external impact.

The invention claimed is:

1. A battery module assembly comprising:
a hexahedral stack arrangement of a plurality of rectangular battery modules, each battery module having a case and two or more battery cells or unit modules connected in series and/or in parallel to each other inside the case, the battery modules being stacked by two or more in a longitudinal direction thereof and two or more in a vertical direction perpendicular to the longitudinal direction thereof such that cases of the battery modules adjacent to each other in the longitudinal direction and in the vertical direction are in direct contact with each other, the hexahedral stack having six outer planes defining the six outer sides of the hexahedral stack, and twelve outer edges of the hexahedral stack defining the six outer planes;
a frame member fixing the twelve outer edges of the hexahedral stack and
coupling parts for mounting, through which the battery module assembly is mounted to an external device, are provided at one side of the frame member,
wherein the coupling parts for mounting are bent so that the coupling parts for mounting protrude outward, ends of the coupling parts for mounting are coupled to the frame member,
wherein the coupling parts for mounting protrude perpendicular to the vertical direction, and
wherein the six outer planes include an upper plane, a lower plane substantially parallel to the lower plane and four side planes extending substantially perpendicular to the upper plane.

2. The battery module assembly according to claim 1, wherein the hexahedral stack is configured such that two rectangular battery modules are arranged in the vertical direction so that the rectangular battery modules are opposite to each other, and one or more rectangular battery modules are arranged in the longitudinal direction with respect to the respective rectangular battery modules.

3. The battery module assembly according to claim 1, wherein each of the rectangular battery modules has a greater height than a width thereof, and the hexahedral stack has a rectangular parallelepiped structure.

4. The battery module assembly according to claim 1, wherein each of the unit modules has plate-shaped battery cells, each of which has electrode terminals formed at the upper end and the lower end thereof, are connected in series to each other, and each of the unit modules comprises two or more battery cells, in which connection parts between the electrode terminals are bent so that the battery cells are stacked, and a cell cover coupled to outer sides of the battery cells excluding regions of the electrode terminals so as to cover the outer sides of the battery cells.

5. The battery module assembly according to claim 1, wherein input and output terminals of the rectangular battery modules are oriented so that the input and output terminals of the rectangular battery modules are directed toward one side (a) of the hexahedral stack.

6. The battery module assembly according to claim 5, wherein a power relay assembly (PRA) is mounted to a rear side (b) opposite to the side where the input and output terminals are located.

7. The battery module assembly according to claim 5, wherein a battery management system (BMS) is mounted to a lateral side (c) adjacent to the side (a) of the hexahedral stack.

8. The battery module assembly according to claim 5, wherein the battery cells or the unit modules in each of the rectangular battery modules are arranged in parallel to a pair of opposite sides (c, d) of the hexahedral stack, and hermetically sealing members are mounted to the opposite sides (c, d).

9. The battery module assembly according to claim 8, wherein each of the hermetically sealing members is bent so that a coolant flow channel is formed at the inner side of each of the hermetically sealing members facing a corresponding one of the rectangular battery modules.

10. The battery module assembly according to claim 8, wherein each of the hermetically sealing members is formed of an insulating material.

11. The battery module assembly according to claim 1, wherein the frame member is configured such that all frames to fix twelve edges of the hexahedral stack are integrally formed or such that frames to fix at least three or four edges of the hexahedral stack constituting one side of the hexahedral stack are integrally formed.

12. The battery module assembly according to claim 1, wherein safety elements and control elements are disposed at a plate fastened to a part of the frame member to fix edges of one side of the hexahedral stack to constitute a PRA.

13. A battery pack comprising a battery module assembly of claim 1.

14. A device comprising a battery pack of claim 13 as a power source.

15. The device according to claim 14, wherein the device is an electric vehicle, a hybrid electric vehicle, a plug-in hybrid electric vehicle, an electric motorcycle, an electric bicycle, or a power storage device.

16. The battery module assembly according to claim 1, wherein a portion of each of the outer six sides is exposed through the frame member.

17. The battery module assembly according to claim 1, wherein each of the coupling parts is located to extend outward beyond the hexahedral stack.

18. The battery module assembly according to claim 17, wherein each of the coupling parts includes a through hole extending in the vertical direction.

* * * * *